US010705520B2

(12) United States Patent
Miyazaki et al.

(10) Patent No.: US 10,705,520 B2
(45) Date of Patent: *Jul. 7, 2020

(54) SERVICE PROVIDING SYSTEM AND NON-TRANSITORY COMPUTER READABLE MEDIUM

(71) Applicant: FUJI XEROX CO., LTD., Tokyo (JP)

(72) Inventors: Mariko Miyazaki, Kanagawa (JP); Hideki Fujimoto, Kanagawa (JP); Hajime Kajiyama, Kanagawa (JP); Naoya Ogata, Kanagawa (JP); Akira Ichikawa, Kanagawa (JP); Tetsuya Kobayashi, Kanagawa (JP); Kunitoshi Yamamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,004

(22) Filed: Dec. 3, 2018

(65) Prior Publication Data
US 2019/0101913 A1 Apr. 4, 2019

Related U.S. Application Data

(63) Continuation of application No. 15/438,943, filed on Feb. 22, 2017, now Pat. No. 10,175,689.

(30) Foreign Application Priority Data
Sep. 8, 2016 (JP) .................................. 2016-175160

(51) Int. Cl.
G05D 1/00 (2006.01)
G05D 1/02 (2020.01)
G05B 15/02 (2006.01)

(52) U.S. Cl.
CPC ............ *G05D 1/0027* (2013.01); *G05B 15/02* (2013.01); *G05D 1/0297* (2013.01); *G05D 2201/0211* (2013.01)

(58) Field of Classification Search
CPC ............... G05D 1/0027; G05D 1/0297; G05D 2201/0211; G05B 15/02
(Continued)

(56) References Cited

U.S. PATENT DOCUMENTS 10,175,689 B2 * 1/2019 Miyazaki ............. G05D 1/0297
2007/0021867 A1 1/2007 Woo
2018/0253100 A1 * 9/2018 Aoki ...................... G05D 1/028

FOREIGN PATENT DOCUMENTS

JP 2001-125646 A 5/2001
JP 2003-110779 A 4/2003
JP 2005-311530 A 11/2005

OTHER PUBLICATIONS

May 7, 2020 Office Action issued in Japanese Patent Application No. 2016-175160.

* cited by examiner

Primary Examiner — Gertrude Arthur Jeanglaude
(74) Attorney, Agent, or Firm — Oliff PLC

(57) ABSTRACT

A self-moving apparatus that provides a service by moving to a destination and includes a detection unit and a reporting unit. A reception unit receives a user instruction for causing the self-moving apparatus to move to a predetermined destination if the self-moving apparatus is in a predetermined state relating to maintenance or printing or if the self-moving apparatus is changed to be in the predetermined state. A detection unit detects a state of the self-moving apparatus. A moving unit that moves to the predetermined destination if the self-moving apparatus is in the predetermined state or if the self-moving apparatus is changed to be
(Continued)

in the predetermined state on the basis of a detection result obtained by the detection unit.

5 Claims, 14 Drawing Sheets

(58) Field of Classification Search
USPC .......................................................... 701/2
See application file for complete search history.

FIG. 3

| NAME OF AREA | WAITING POSITION | END POSITION |
|---|---|---|
| MAINTENANCE AREA 1 | ..... | ..... |
| MAINTENANCE AREA 2 | ..... | ..... |

FIG. 4

| DETECTION ITEMS |
|---|
| TONER REMAINING AMOUNT |
| PAPER REMAINING AMOUNT |
| TOTAL PRINTED SHEETS OF PAPER |
| TOTAL MOVEMENT TIME |
| ⋮ |

FIG. 5

MAINTENANCE DATE AND TIME

| INSTANTLY ▽ |
|---|
| INSTANTLY |
| SPECIFY YEAR, DATE, AND TIME |
| PERIODICALLY |
| NO SPECIFICATION |

FIG. 6

YEAR, DATE, AND TIME

| YEAR 2016 ▽ | JANUARY ▽ | 1st ▽ | 0 ▽ | 0 ▽ |
|---|---|---|---|---|
| YEAR 2016 | JANUARY | 1st | 0 | 0 |
| YEAR 2017 | FEBRUARY | 2nd | 1 | 1 |
| ⋮ | ⋮ | ⋮ | ⋮ | ⋮ |
| | DECEMBER | 31st | 23 | 59 |

FIG. 7

PERIODICALLY

| WEEKLY ▽ |
| WEEKLY |
| MONTHLY |

FIG. 8

PERIODICALLY (WEEKLY)

| MONDAY ▽ | | 0 ▽ | | 0 ▽ |
| MONDAY | | 0 | | 0 |
| TUESDAY | | 1 | | 1 |
| ⋮ | | ⋮ | | ⋮ |
| SUNDAY | | 23 | | 59 |

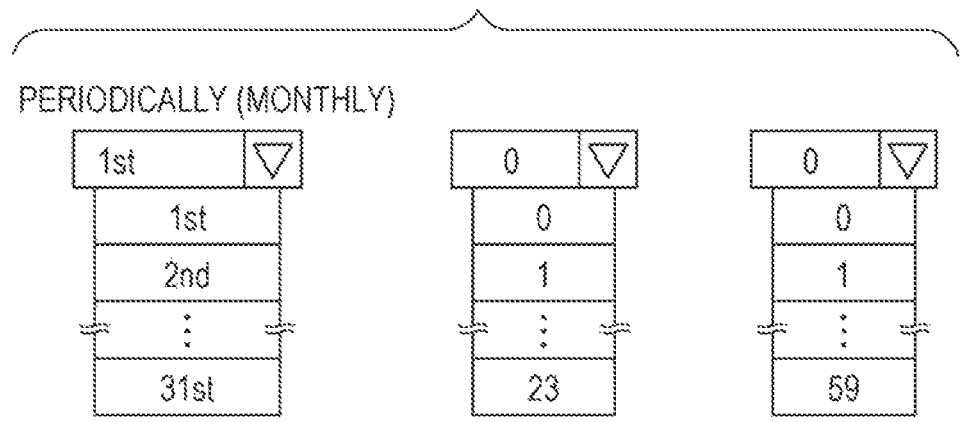

FIG. 12

SPECIFY BY CONDITIONS

☑ TONER REMAINING AMOUNT
| 0% ▽ |
| 0% |
| 5% OR LESS |
| 10% OR LESS |

☐ PAPER REMAINING AMOUNT
| 0% ▽ |
| 0% |
| 5% OR LESS |
| 10% OR LESS |

☐ TOTAL PRINTED SHEETS OF PAPER
| 100,000 SHEETS OR MORE ▽ |
| 100,000 SHEETS OR MORE |
| 200,000 SHEETS OR MORE |
| 300,000 SHEETS OR MORE |

☐ TOTAL MOVEMENT TIME
| 1,000 HOURS OR MORE ▽ |
| 1,000 HOURS OR MORE |
| 5,000 HOURS OR MORE |
| 10,000 HOURS OR MORE |

PRIORITY

● NORMAL  ○ HIGH PRIORITY

| TASK ID | 0101 |
|---|---|
| DATE AND TIME | 2016 DECEMBER 16th, 9:00 |
| DESTINATION | MAINTENANCE AREA 1 |
| PRIORITY | NORMAL |
| TARGET MACHINE | TONER REMAINING AMOUNT 10% OR LESS |

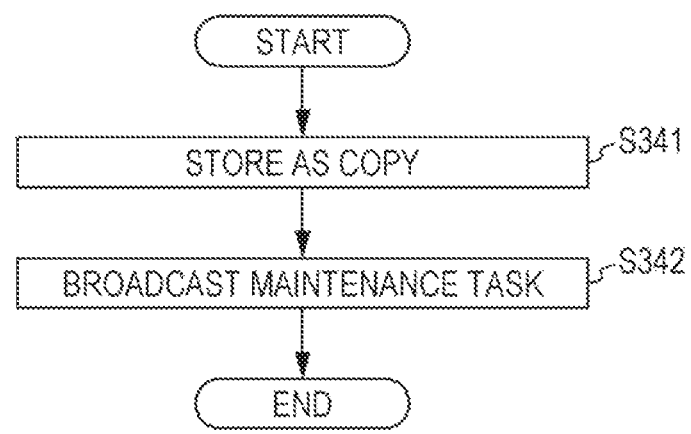
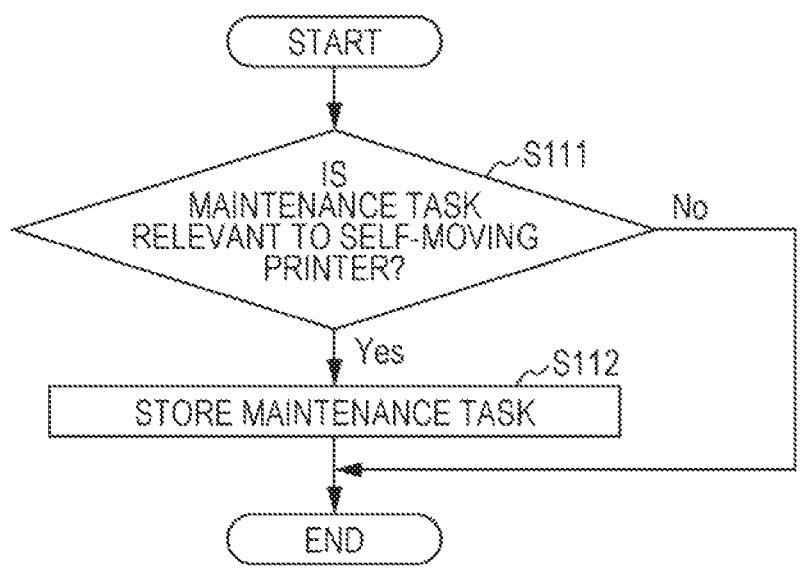

SERVICE PROVIDING SYSTEM AND NON-TRANSITORY COMPUTER READABLE MEDIUM

CROSS-REFERENCE TO RELATED APPLICATIONS

This application is a continuation application of U.S. patent application Ser. No. 15/438,943, filed Feb. 22, 2017, which is based on and claims priority under 35 USC 119 from Japanese Patent Application No. 2016-175160 filed Sep. 8, 2016. The disclosures of each of the above are hereby incorporated by reference in their entireties.

BACKGROUND

(i) Technical Field

The present invention relates to a service providing system and a non-transitory computer readable medium.

(ii) Related Art

There is known a service providing system including a self-moving apparatus that provides a service by moving within a predetermined space.

SUMMARY

According to an aspect of the invention, there is provided a service providing system including at least one self-moving apparatus and a server apparatus. The self-moving apparatus moves within a predetermined area, provides a service by moving to a destination in response to and in accordance with an instruction for providing the service, and includes a detection unit and a reporting unit. The detection unit detects a state of the self-moving apparatus. The reporting unit sends, to the server apparatus, a report about the state of the self-moving apparatus detected by the detection unit. The server apparatus instructs the self-moving apparatus to provide the service and includes a reception unit, a report-reception unit, and a first instruction unit. The reception unit receives a user instruction for causing the self-moving apparatus to move to a predetermined destination if the self-moving apparatus is in a predetermined state or if the self-moving apparatus is changed to be in the predetermined state. The report-reception unit receives the report about the state of the self-moving apparatus from the self-moving apparatus. The first instruction unit instructs the self-moving apparatus to move to the predetermined destination upon the reception unit receiving the user instruction if the report received by the report-reception unit is a report indicating that the self-moving apparatus is in the predetermined state or that the self-moving apparatus is changed to be in the predetermined state.

BRIEF DESCRIPTION OF THE DRAWINGS

Exemplary embodiments of the present invention will be described in detail based on the following figures, wherein:

FIG. 3 illustrates position information regarding each maintenance area;

FIG. 4 illustrates detection items indicating the state of each self-moving printer detected by the corresponding self-moving printer;

FIG. 5 illustrates a screen for specifying a maintenance date and time;

FIG. 6 illustrates a sub-menu screen displayed if "specify year, date, and time" has been selected on the menu screen illustrated in FIG. 5;

FIG. 7 illustrates a sub-menu screen displayed if "periodically" has been selected on the menu screen illustrated in FIG. 5;

FIG. 8 illustrates a sub-menu screen displayed if "weekly" has been selected on the sub-menu screen illustrated in FIG. 7;

FIG. 9 illustrates a sub-menu screen displayed if "monthly" has been selected on the sub-menu screen illustrated in FIG. 7;

FIG. 10 illustrates a menu screen for specifying a self-moving printer as a maintenance target;

FIG. 11 illustrates a sub-menu screen displayed if "specify individually" has been selected on the menu screen illustrated in FIG. 10;

FIG. 12 illustrates a sub-menu screen displayed if "specify by conditions" has been selected on the menu screen illustrated in FIG. 10;

FIG. 24 is a flowchart illustrating a maintenance task reception process performed by the server upon receiving a maintenance task in a second exemplary embodiment;

FIG. 25 is a flowchart illustrating a maintenance task reception process performed by each self-moving printer that has received a broadcast maintenance task;

DETAILED DESCRIPTION

Now, the exemplary embodiments of the present invention will be described.

Figure 1:
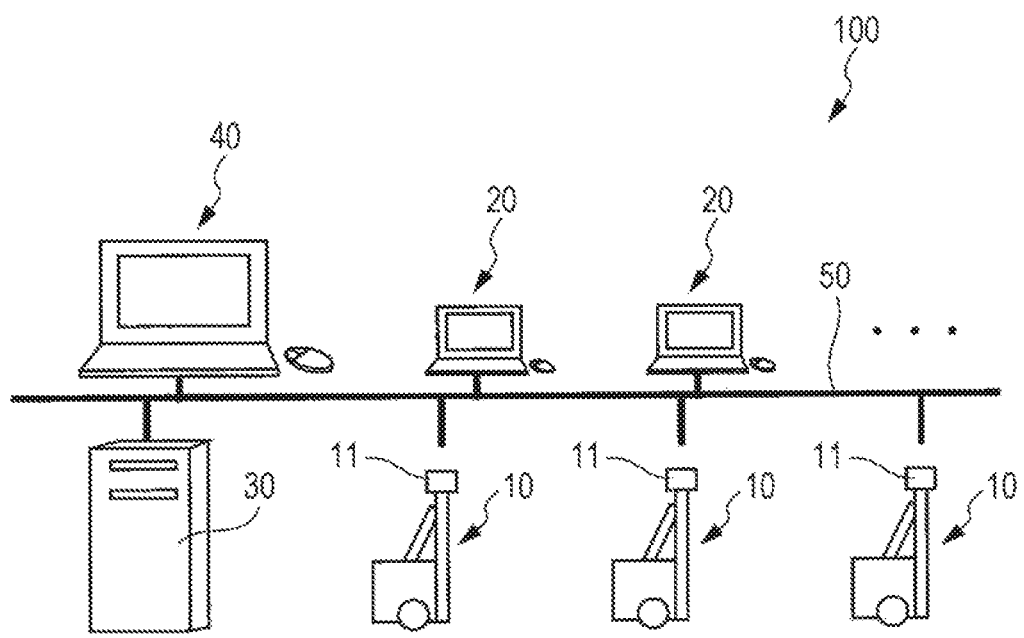
FIG. 1 illustrates the entire configuration of a print system according to a first exemplary embodiment of the present invention.

FIG. 1 illustrates the entire configuration of a print system 100 according to a first exemplary embodiment of the present invention.

The print system 100 includes three self-moving printers 10. Each of the self-moving printers 10 is, for example, a printer employing a so-called electrophotographic system. Note that each of the self-moving printers 10 may be a printer employing a method other than the electrophotographic system, such as an ink-jet method.

The self-moving printers 10 moves within an office 60, which will be described later with reference to FIG. 2. Note that each of the self-moving printers 10 includes a camera 11 in order to monitor the area in front of the self-moving printer 10 with the camera 11 and moves by avoiding obstacles that are present ahead of the self-moving printer 10. Upon receiving a printing instruction from a user, the self-moving printers 10 move to the user to execute printing.

The print system 100 further includes plural client personal computers (hereinafter abbreviated to PCs) 20. Each of the client PCs 20 is a PC operated by a corresponding user and issues a printing instruction.

The print system 100 further includes a server 30. Upon receiving a printing instruction transmitted from the client PCs 20, the server 30 assigns the instruction to any of the three self-moving printers 10 and causes the assigned self-moving printers 10 to execute printing in accordance with the instruction. The printing instruction is assigned on the basis of a predetermined assignment algorithm, and for example, a printing instruction transmitted from one of the client PCs 20 may be assigned to a self-moving printer 10 that is the closest to the desk of a user who is using the client PC 20 or may be assigned to a self-moving printer 10 that is in a waiting state and that is not currently executing printing. Further description of the method for assigning the printing instruction will be omitted from this exemplary embodiment.

The print system 100 further includes a manager PC 40. The manager PC 40 is a PC operated by a manager who manages the print system 100. By operating the manager PC 40, the manager is capable of checking the overall situation of the print system 100 including the current positions of the self-moving printers 10 and how many printing jobs are queued in each of the self-moving printers 10, and the like. By using the manager PC 40, the manager is also capable of checking the internal state of each of the self-moving printers 10, such as the remaining amount of consumables including the toner and paper, the operation history, and the like. The manager PC 40, as necessary, issues instructions for the self-moving printers 10, for which maintenance is required, to move to or assemble at a maintenance area (see FIG. 2).

Note that the above-described self-moving printers 10, the client PCs 20, the server 30, and the manager PC 40 are capable of communicating with one another through a wireless local area network (LAN) 50.

Figure 2:
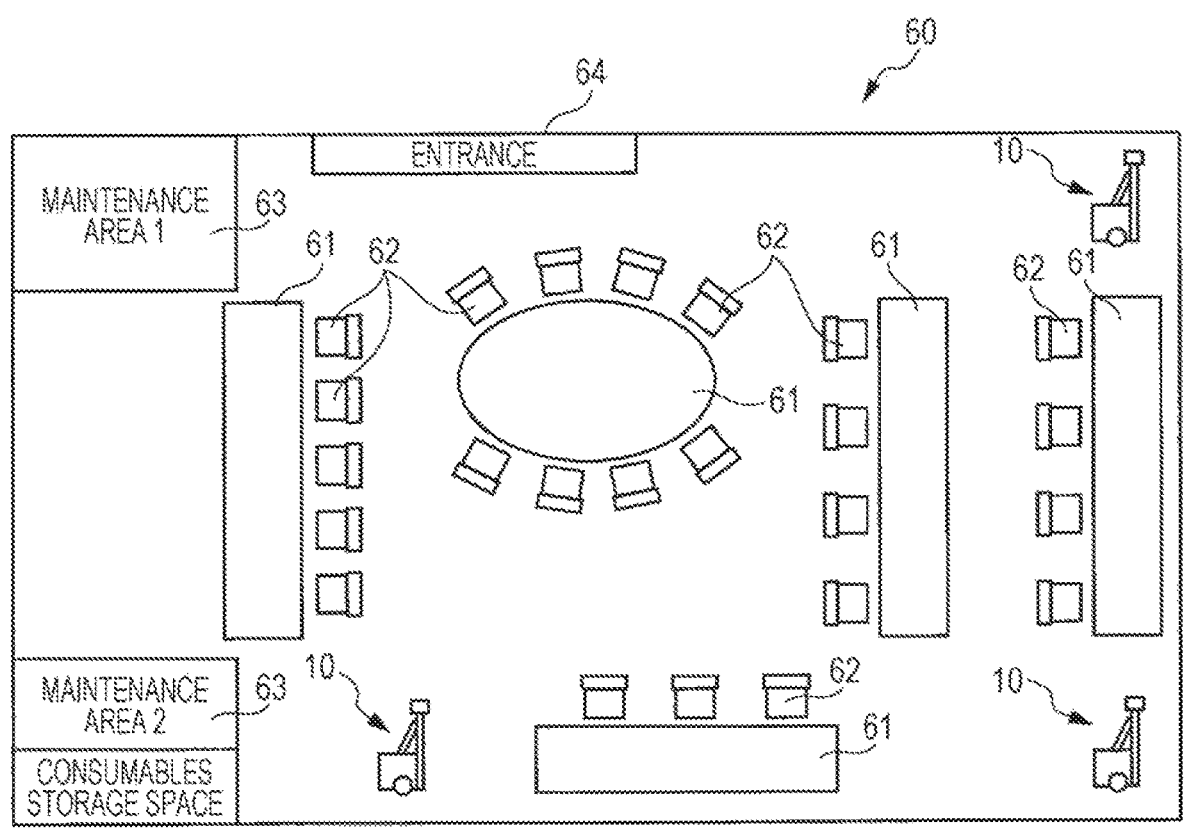
FIG. 2 schematically illustrates the layout of an office.

FIG. 2 schematically illustrates the layout of the office 60.

In the office 60, plural tables 61 and many chairs 62 are arranged. Each of the chairs 62 is given a unique seat number, and the seat numbers are registered in the server 30.

FIG. 2 also illustrates three self-moving printers 10. The positions of the three self-moving printers 10 in FIG. 2 are waiting positions of the self-moving printers 10 in the office 60. Charging equipment, which is not illustrated, is provided at each of the waiting positions, and the self-moving printers 10 move to the waiting positions to be charged by the charging equipment. By using energy obtained by the charging, the self-moving printers 10 move and execute printing.

FIG. 2 does not illustrate the server 30 or the manager PC 40, which are illustrated in FIG. 1. The server 30 and the manager PC 40 are installed at a corner of the office 60 or a room other than the office 60, for example.

In the office 60, two maintenance areas 63, which are a maintenance area 1 and a maintenance area 2, are provided. The maintenance area 1 is an area in which a maintenance staff performs maintenance such as part replacement. The maintenance area 2 is an area in which even a person who is not a maintenance staff performs maintenance such as replacement of a toner cartridge, refill of sheets of paper for printing, and the like. A consumables storage space is provided in the maintenance area 2, where toner cartridges for replacement, sheets of paper for replacement, and the like are stocked.

Information regarding the layout and the like of the office 60 is registered in advance in the server 30 (see FIG. 1). Information regarding users who are authorized to use the office 60 is also registered in advance in the server 30.

Users who use the office 60 enter through an entrance 64 of the office 60 and take available seats. Then, the users prepare their own PCs (client PCs 20 illustrated in FIG. 1) on the tables 61 and perform a log-in process. In the log-in process, each user inputs a user ID and a password as the certification of the user who is authorized to use the office 60 and further inputs the seat number of the user. The server 30 performs user authentication on the basis of the input information and obtains information on the seat number of the user. Upon the user authentication, the user is allowed to use the self-moving printers 10. The user notifies the server 30 of exit by performing a log-out process in order to leave the office 60.

A feature of this exemplary embodiment is not a typical printing service provided by the self-moving printers 10, but is a process regarding maintenance of the self-moving printers 10. Accordingly, the following description focuses on a maintenance process of the self-moving printers 10.

FIG. 3 illustrates position information regarding each of the maintenance areas 1 and 2. The position information illustrated in FIG. 3 is registered in advance in the server 30.

A waiting position and an end position are defined in each of the maintenance areas 1 and 2.

The waiting position is a position in the maintenance area to which a self-moving printer 10 moves and at which the self-moving printer 10 waits to undergo maintenance.

If plural self-moving printers 10 move to the same maintenance area, the plural self-moving printers 10 line up, with the self-moving printer 10 at the waiting position at the front of the line, to wait for their maintenance turn. Note that the end position is the position at the back end of the line in which the self-moving printers 10 are allowed to assemble to wait for their maintenance turn. The lining up of the plural self-moving printers 10 in the maintenance area will be specifically described later.

FIG. 4 illustrates detection items indicating the state of each self-moving printer 10 detected in the corresponding self-moving printer 10.

Sensors, counters, and the like, which are not illustrated, are provided for each self-moving printer 10, and items that are necessary to determine the necessity of maintenance, such as a toner remaining amount, a paper remaining amount, the total printed sheets of paper, the total movement time, and the like illustrated in FIG. 4, are detected in the self-moving printer 10.

Immediately before or before performing maintenance of a self-moving printer 10, maintenance instruction information is input to the manager PC 40 illustrated in FIG. 1. A setting in which the maintenance instruction information is input will be described below.

FIGS. 5 though 14 each illustrate a menu screen displayed on the manager PC 40 in the setting in which the maintenance instruction information is input. The menu screens are separately illustrated in different drawings according to the items for the convenience of the drawings. Note that fewer menu screens may be designed so as to receive the same or substantially the same information.

FIG. 5 illustrates a screen for specifying a maintenance date and time.

Here, by using the pull-down menu, one of "instantly", "specify year, date, and time", "periodically" and "no specification" is selected.

The term "instantly" means that maintenance is performed immediately after completion of input for this specification.

The term "specify year, date, and time" means that maintenance is performed at the specified year, date, and time.

The term "periodically" means that maintenance is performed periodically.

The term "no specification" means that maintenance is performed when conditions other than date, time, and the like are satisfied without specifying the date, time, and the like. For example, a condition corresponds to an instruction (maintenance task) for instructing a self-moving printer 10 to move to the maintenance area 2 in the case of running out of paper.

FIG. 6 illustrates a sub-menu screen displayed if "specify year, date, and time" has been selected on the menu screen illustrated in FIG. 5.

Here, by using each of the pull-down menus, the year, month, day, hour, and minute are specified.

FIG. 7 illustrates a sub-menu screen displayed if "periodically" has been selected on the menu screen illustrated in FIG. 5.

Here, by using the pull-down menu, "weekly" or "monthly" is selected.

FIG. 8 illustrates a sub-menu screen displayed if "weekly" has been selected on the sub-menu screen illustrated in FIG. 7.

Here, by using each of the pull-down menus, one of days among Monday to Sunday and the hour and minute are specified.

FIG. 9 illustrates a sub-menu screen displayed if "monthly" has been selected on the sub-menu screen illustrated in FIG. 7.

Here, by using each of the pull-down menus, the day, hour, and minute for maintenance in each month are specified.

FIG. 10 illustrates a menu screen for specifying a self-moving printer 10 as a maintenance target.

Here, by using the pull-down menu, one of "all", "specify individually", and "specify by conditions" is selected.

The term "all" means that all of the self-moving printers 10 included in the print system 100 are maintenance targets. Accordingly, for example, if "instantly" has been selected on the menu screen illustrated in FIG. 5 and then "all" has been selected on the menu screen illustrated in FIG. 10, all of the self-moving printers 10 included in the print system 100 are made to assemble immediately.

The term "specify individually" on the menu screen in FIG. 10 means that a self-moving printer 10 that will undergo maintenance is designated.

The term "specify by conditions" means that conditions for performing maintenance are specified.

FIG. 11 illustrates a sub-menu screen displayed if "specify individually" has been selected on the menu screen illustrated in FIG. 10.

In the pull-down menu here, the identifications (IDs) of all of the self-moving printers 10 included in the print system 100, the IDs having been registered in advance, are displayed. By selecting one of the IDs, the self-moving printer 10 as the maintenance target is designated.

FIG. 12 illustrates a sub-menu screen displayed if "specify by conditions" has been selected on the menu screen illustrated in FIG. 10.

Here, a checkmark is added to a box of an item to be selected, and by using the pull-down menu, details of the selected item are selected. Here, for example, "toner remaining amount" and "10% or less" are selected. It is possible to add checkmarks to plural item boxes. That is, it is possible to select "toner remaining amount" and "10% or less" and also "sheet remaining amount" and "5% or less", for example.

In this example, a self-moving printer 10 that satisfies the thus specified conditions is the maintenance target. If, for example, the maintenance date, time, and the like have been specified, at the timing the date, time, and the like have been reached, it is determined whether the specified conditions are satisfied, and a self-moving printer 10 that satisfies the conditions at this time is the maintenance target.

Figures 13, 14, 15:
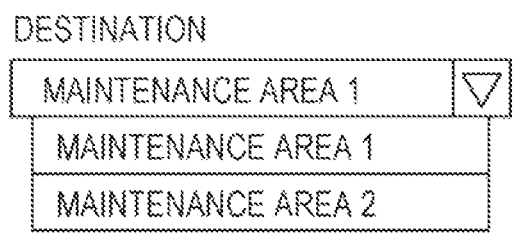
FIG. 13 illustrates a menu screen for selecting a maintenance area.
FIG. 14 illustrates a menu screen for selecting priority.
FIG. 15 illustrates an example of a maintenance task.

FIG. 13 illustrates a menu screen for selecting a maintenance area.

Here, by using the pull-down menu, the maintenance area 1 or the maintenance area 2 is selected. The maintenance area specified here corresponds to the destination to which the self-moving printer 10 as the maintenance target moves when the maintenance timing has been reached.

However, the menu screen illustrated in FIG. 13 is skipped if the maintenance area is uniquely determined in accordance with the specified content, for example, if maintenance due to a small toner remaining amount is performed in the maintenance area 2.

FIG. 14 illustrates a menu screen for selecting priority.

In this example, radio buttons are used to select "normal" or "high priority".

For a printing task, which is a normal task of each self-moving printer 10, "normal" or "high priority" is selected. The term "normal" for a printing task means that the printing task waits for its turn if printing jobs are queued. In this case, printing corresponding to the printing task is executed after completion of printing corresponding to the prior printing instructions. On the other hand, the term "high priority" for a printing task means that the printing task assembles at the front of jobs waiting for their turn. In this case, printing corresponding to the printing task is executed immediately after the completion of printing that is currently executed. Note that if there are plural jobs specified as "high priority", even if "high priority" is selected for a printing task, the printing task waits for its turn among the jobs selected as "high priority". Accordingly, "urgent", which means a higher priority than "high priority", may be included as another choice. An instruction of "urgent" precedes the jobs of "high priority".

In this exemplary embodiment, the priority is also selected from "normal" and "high priority" for maintenance. Although "urgent" may also be selected for maintenance, this exemplary embodiment does not describe "urgent".

In the case where "normal" is specified for maintenance, if printing jobs are queued at the time the maintenance timing for a self-moving printer 10 has been reached, after processes such as printing corresponding to the jobs are completed, the self-moving printer 10 moves to the maintenance area. On the other hand, in the case where "high priority" is specified for maintenance, even if print jobs are queued at the time the maintenance timing for a self-moving printer 10 has been reached, the self-moving printer 10 moves to the maintenance area because maintenance precedes the other jobs. However, if there are jobs specified as "high priority", the jobs wait for their turn.

FIG. 15 illustrates an example of a maintenance task.

If specifications regarding maintenance have been input through the manager PC 40 in the manner described with reference to FIGS. 5 through 14, a maintenance task as an aggregate of the specifications is generated in the manager PC 40, and the generated maintenance task is transmitted to the server 30.

FIG. 15 illustrates an example of the maintenance task generated in the above manner.

This maintenance task includes items of "task ID", "date and time", "destination", "priority", and "target machine".

The item "task ID" indicates the ID for designating the maintenance task and is 0101 in this example.

The item "date and time" indicates the date and time at which maintenance is to be performed. In this example, 2016 Dec. 16, 9:00 is specified.

The item "destination" indicates the location to which the self-moving printer 10 moves for maintenance at this date and time. In this example, the maintenance area 1 is specified.

The item "priority" indicates the priority of the maintenance to be performed at this time. In this example, "normal" is specified as the priority.

The item "target machine" indicates a condition for designating the self-moving printer 10 as a maintenance target. In this example, a self-moving printer 10 with a toner remaining amount of 10% or less is specified as the maintenance target.

Figure 16:
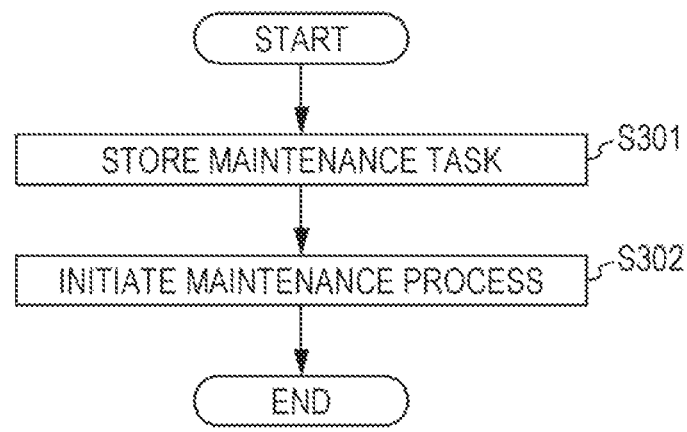
FIG. 16 is a flowchart illustrating a maintenance task reception process performed by a server upon receiving a maintenance task.

FIG. 16 is a flowchart illustrating a maintenance task reception process performed by the server 30 upon receiving a maintenance task.

If a manager generates the maintenance task in the above manner by using the manager PC 40, the generated maintenance task is transmitted to the server 30. Upon receiving the maintenance task, the server 30 performs the maintenance task reception process illustrated in FIG. 16.

In this example, first, the received maintenance task is stored in the server 30 (step S301). Then, a maintenance process illustrated in FIG. 18, which will be described later, is initiated (step S302).

Figure 17:
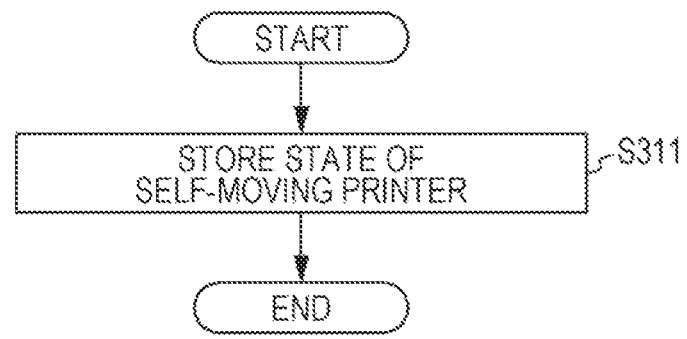
FIG. 17 is a flowchart illustrating a report reception process.

FIG. 17 is a flowchart illustrating a report reception process.

Various sensors and counters are provided for each of the self-moving printers 10, and in the self-moving printer 10, information indicating the state of the self-moving printer 10 to be used for determination of the maintenance timing is collected, and the collected information is transmitted to the server 30 as a report (see FIG. 4). The report reception process illustrated in FIG. 17 is performed every time a report about the state of each self-moving printer 10 is received from the corresponding self-moving printer 10.

Here, the information that indicates the state of the self-moving printer 10 and that has been transmitted as a report is stored in the server 30 (step S311).

Figure 18:
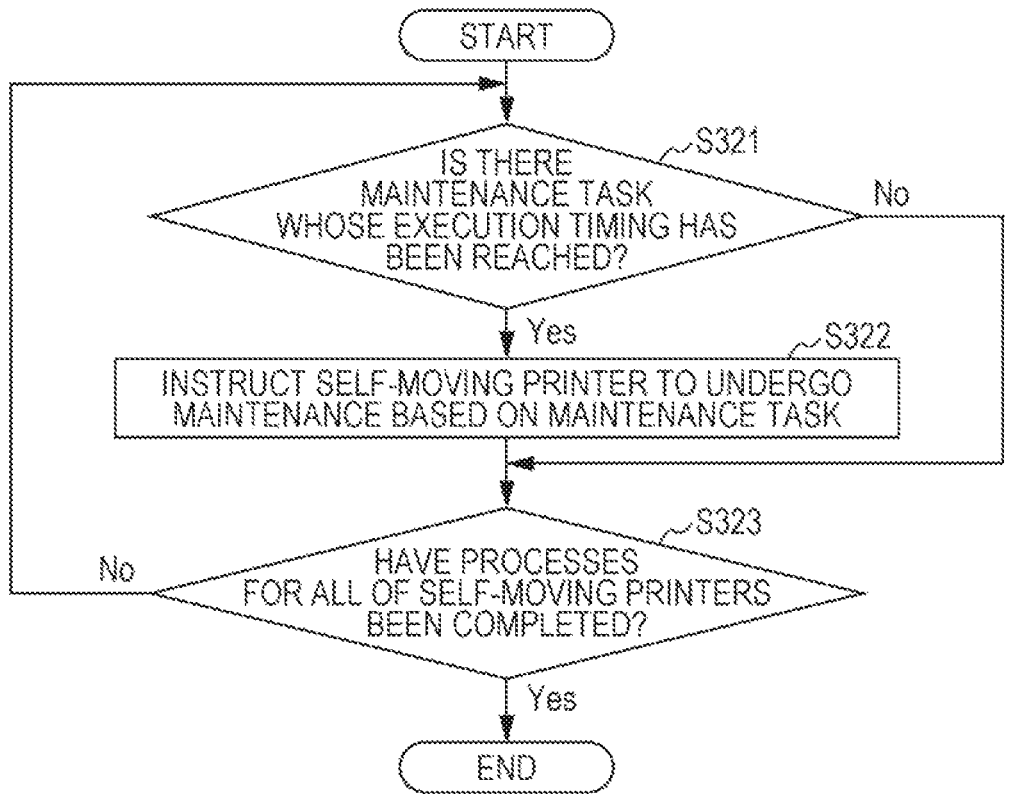
FIG. 18 is a flowchart illustrating a maintenance process.

FIG. 18 is a flowchart illustrating a maintenance process. The maintenance process illustrated in FIG. 18 is also performed by the server 30.

As an example, this maintenance process is initiated after the maintenance task reception process illustrated in FIG. 16 upon the server 30 receiving the maintenance task.

In addition, every time a certain task, such as a printing task (single printing process) is completed, each of the self-moving printers 10 reports the server 30 of completion of the task. As another example, the maintenance process illustrated in FIG. 18 may be initiated upon the server 30 receiving the report about the completion of the task from each of the self-moving printers 10.

Furthermore, the maintenance process illustrated in FIG. 18 is performed repeatedly and periodically, e.g., every minute.

Upon initiating the maintenance process illustrated in FIG. 18, first, it is determined whether there is a maintenance task whose execution timing has been reached (step S321). For this determination, the information on the maintenance task stored in step S301 in FIG. 6 is compared with the information indicating the state of each self-moving printer 10 stored in step S311 in FIG. 17. As described above, the maintenance process is initiated not only upon receiving the maintenance task, but also upon receiving a report about completion of a certain task from each of the self-moving printers 10, or periodically, e.g., every minute. Accordingly, at the timing the maintenance process illustrated in FIG. 18 is initiated, a maintenance task might not be present in some cases. In addition, even if the maintenance process is initiated upon receiving the maintenance task, the date and time (see FIG. 5) at which the maintenance task, which has led the initiation of the maintenance process, is to be executed, might not be "instantly", and the maintenance task might remain to be stored in the server 30 (step S301 in FIG. 16) until the maintenance timing is reached. Furthermore, there might be a maintenance task that is to be executed when conditions other than the time, such as a toner remaining amount of 10% or less, are satisfied. Accordingly, in the maintenance process illustrated in FIG. 18, first, it is determined whether there is a maintenance task whose execution timing has been reached (step S321). The determination is sequentially performed on the self-moving printers 10 one by one. With respect to a certain self-moving printer 10, if it is determined in step S321 that there is no maintenance task whose execution timing has been reached, the process proceeds to step S323. If there is a self-moving printer 10 that has not been subject to the determination, the process returns to step S321, and with respect to the self-moving printer 10 that has not been subject to the determination, it is determined whether there is a maintenance task whose execution timing has been reached. If it is determined in step S323 that the processes for all of the self-moving printers 10 have been completed, this maintenance process is completed.

With respect to a certain self-moving printer 10, if it is determined in step S321 that there is a maintenance task whose execution timing has been reached, the self-moving printer 10 is instructed to undergo maintenance based on the maintenance task (step S322). Upon receiving the instruction, the self-moving printer 10 executes tasks that are to be executed in advance in accordance with the order of priority, and when the tasks are completed, the self-moving printer 10 starts moving to the specified maintenance area.

Figure 19:
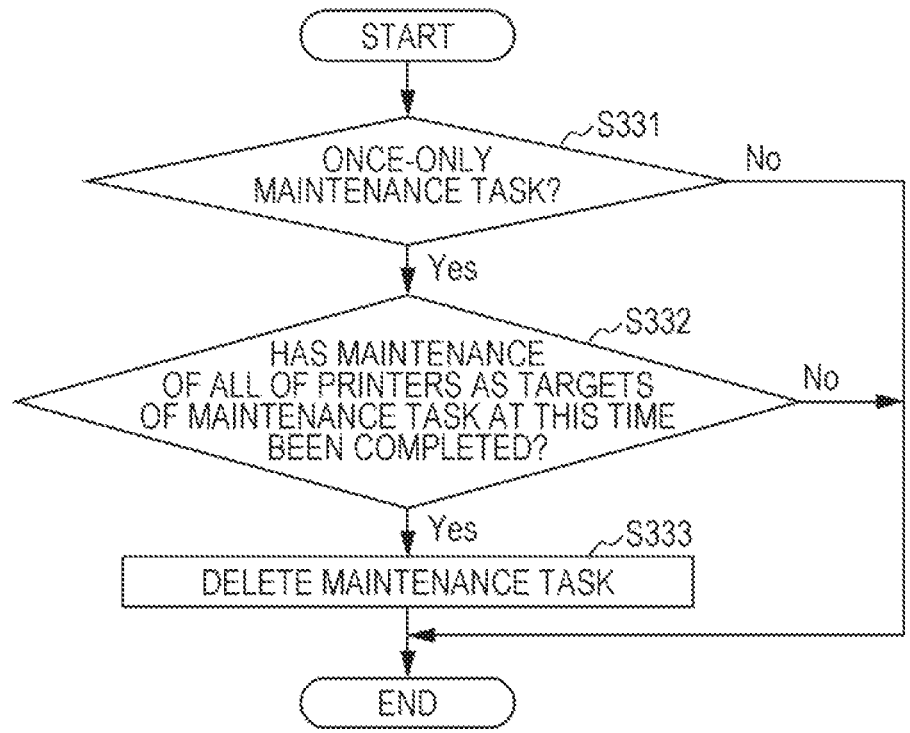
FIG. 19 is a flowchart illustrating a maintenance completion process performed by the server at the time of completion of maintenance.

FIG. 19 is a flowchart illustrating a maintenance completion process performed by the server at the time of completion of maintenance.

Each of the self-moving printers 10 is provided with an operation element (not illustrated), such as a push button, which is operated at the time of completion of maintenance.

Upon completing maintenance of a certain self-moving printer 10, a maintenance operator who has performed the maintenance at this time operates the operation element, and the server 30 is notified of the completion of the maintenance. Then, the server 30 performs the maintenance completion process illustrated in FIG. 19.

In the maintenance completion process illustrated in FIG. 19, it is determined whether the maintenance task corresponding to an instruction of the maintenance performed at this time is a maintenance task corresponding to an instruction of once-only maintenance (step S331). If the maintenance task at this time is a maintenance task that might be executed again at a future timing, such as a maintenance task whose execution date and time (see FIG. 5) is "periodically", the maintenance completion process ends without deleting the maintenance task at this time from memory.

On the other hand, if the maintenance task at this time is a maintenance task corresponding to an instruction of once-only maintenance, then, it is determined whether maintenance of all of the self-moving printers 10, which are the targets of the maintenance task at this time, has been completed (step S332). This is because the maintenance task at this time might include maintenance instructions for plural self-moving printers 10 in some cases. If there is a self-moving printer 10 for which the maintenance corresponding to the maintenance task at this time has not been completed, the maintenance completion process ends without deleting the maintenance task at this time from memory.

On the other hand, if the maintenance task at this time is a maintenance task corresponding to an instruction of once-only maintenance and the maintenance of all of the self-moving printers 10, which are the maintenance targets of the maintenance task, has been completed, the maintenance task stored in the server 30 is deleted (step S333).

Next, the operation of the self-moving printer 10 after starting moving to a maintenance area to undergo the maintenance will be described.

In some cases, plural self-moving printers 10 might move toward the same maintenance area. Accordingly, if plural self-moving printers 10 move toward the same maintenance area, it is necessary to adjust the operations of the self-moving printers 10.

Figure 20:
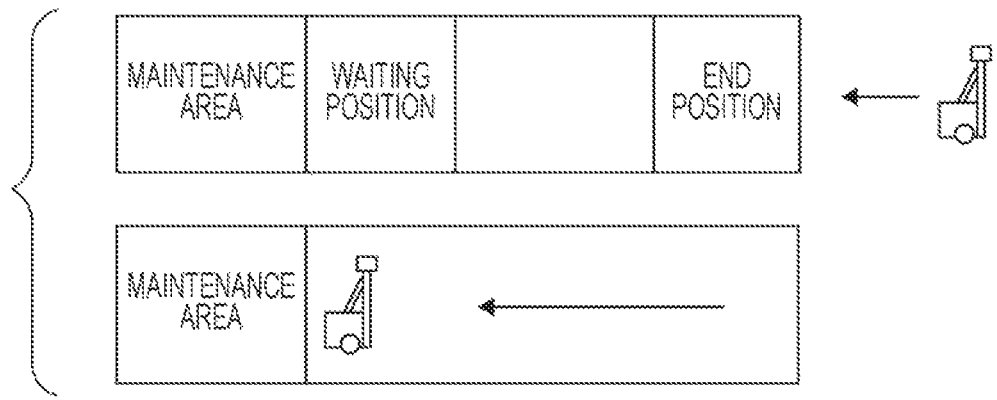
FIG. 20 illustrates a basic operation pattern of each self-moving printer moving to a maintenance area.

FIG. 20 illustrates a basic operation pattern of each self-moving printer 10 moving to a maintenance area.

If a self-moving printer 10 moves to a maintenance area where no other self-moving printers 10 are present and the self-moving printer 10 is the first self-moving printer 10 to reach the maintenance area, the self-moving printer 10 operates as illustrated in FIG. 20. That is, the self-moving printer 10 moving to the maintenance area first moves to the end position (see FIG. 3) in the maintenance area, changes its orientation from the end position to face the waiting position, slowly moves forward to the waiting position, and stops at the waiting position.

Figure 21:
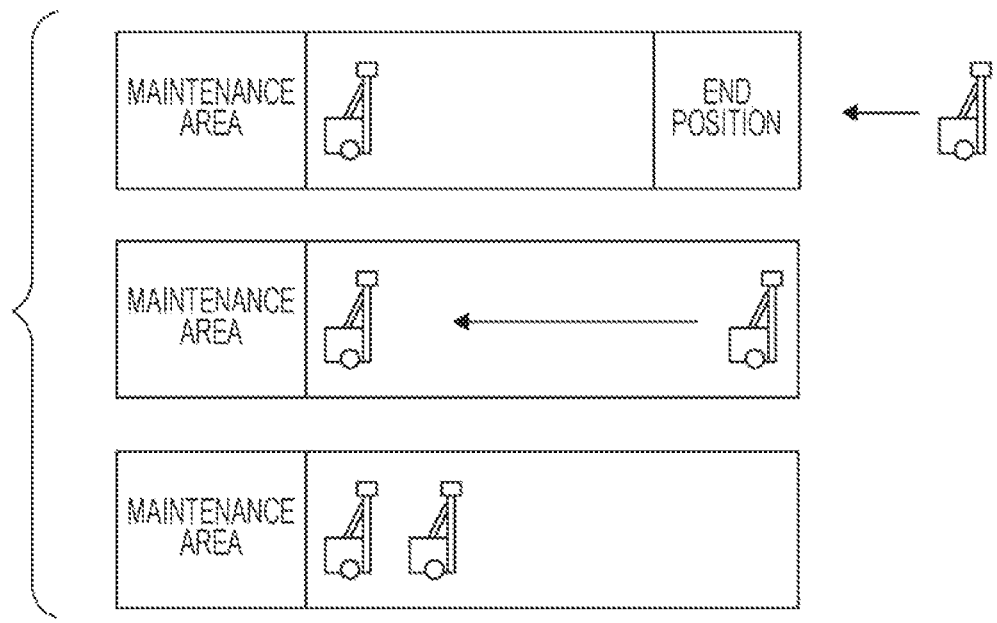
FIG. 21 illustrates an operation pattern of each self-moving printer in the case where another self-moving printer has already reached the maintenance area.

FIG. 21 illustrates an operation pattern of each self-moving printer 10 in the case where another self-moving printer 10 has already reached the maintenance area.

As illustrated in FIG. 21, if another self-moving printer 10 has lined up before the self-moving printer 10, the self-moving printer 10 first moves to the end position in the maintenance area and changes its orientation to face the waiting position, and then slowly moves forward to the waiting position to line up, at a fixed distance, behind the self-moving printer 10 that has lined up at the backend. The camera 11 is provided for each self-moving printer 10, and the self-moving printer 10 stores in advance an image of the back of the self-moving printer 10 obtained by capturing the image with the camera 11. When the self-moving printer 10 lines up behind the self-moving printer 10 that has lined up at the backend, the self-moving printer 10 obtains the distance to the backend self-moving printer 10 from the angle of view of the image of the back of the backend self-moving printer 10, the image having been captured with the camera 11, moves forward until the distance corresponds to the fixed distance determined in advance, and stops.

Figure 22:
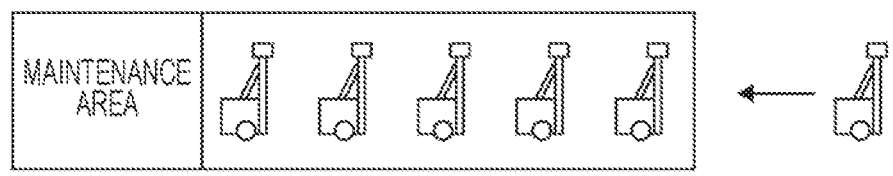
FIG. 22 illustrates an operation pattern of each self-moving printer in the case where the maintenance area is filled with self-moving printers that have already reached the maintenance area.

FIG. 22 illustrates an operation pattern of each self-moving printer 10 in the case where the maintenance area is filled with self-moving printers 10 that have already reached the maintenance area. Although the print system 100 illustrated in FIG. 1 is a system including only three self-moving printers 10, this example will describe the system including more self-moving printers 10 for the convenience of description.

The end position in the maintenance area is the position at the back end of a line in which the self-moving printers 10 are allowed to line up and wait. In the case where a certain self-moving printer 10 moves toward the maintenance area, if self-moving printers 10 that have already reached the maintenance area have lined up and the self-moving printer 10 would be beyond the end position in the maintenance area if lined up behind the line, the self-moving printer 10 does not line up behind the line, but starts a timer that measures the time at which the end position is considered vacant and moves around or returns to the waiting position. Alternatively, if there is a task in a waiting state, the self-moving printer 10 performs a process of the task. By waiting for time-up of the timer, that is, by waiting until the end position is considered vacant, the self-moving printer 10 moves to the maintenance area again. This is because the self-moving printer 10 lined up beyond the end position would interfere with the movement of the other self-moving printers 10, a user, and the like.

Figure 23:
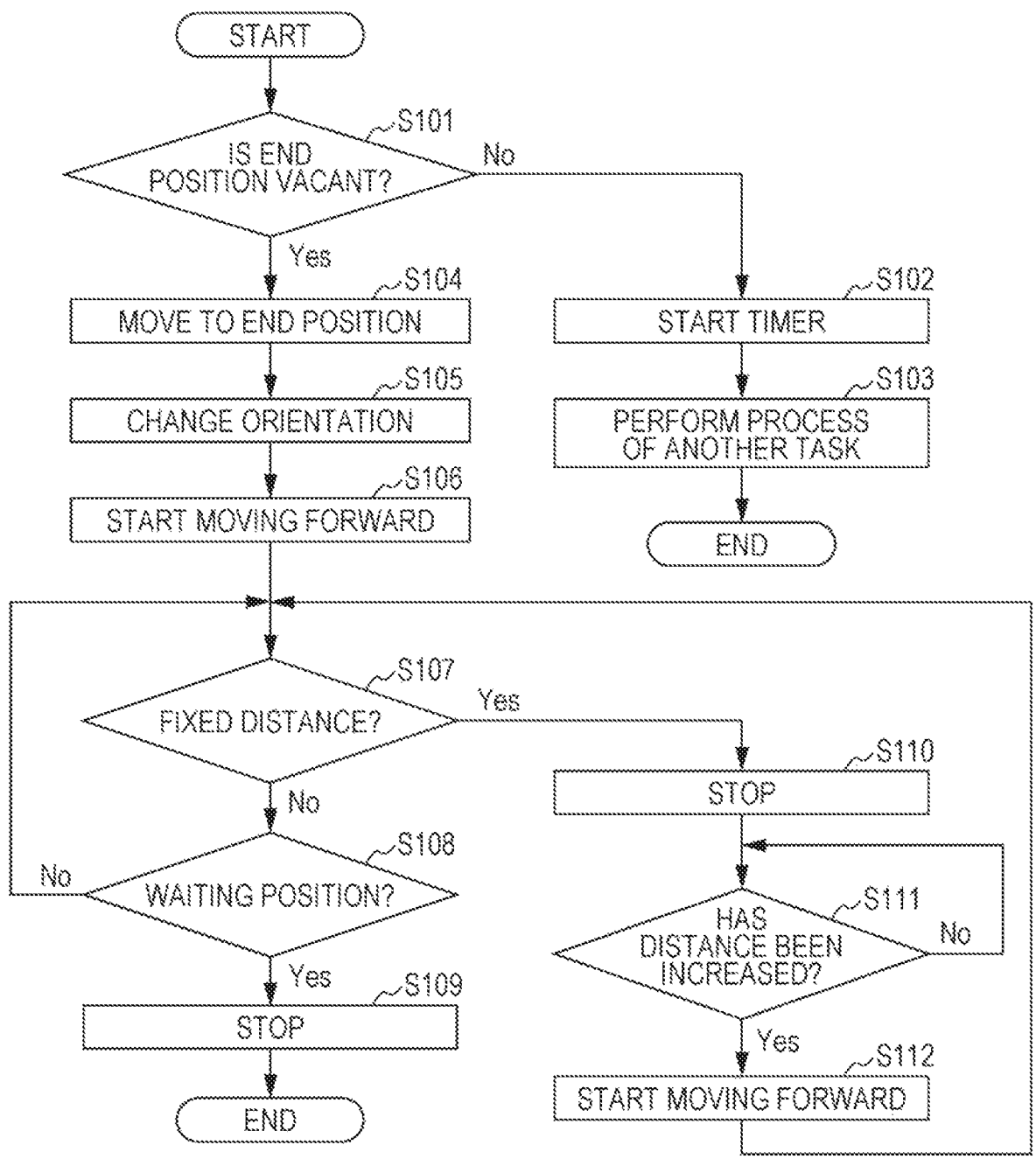
FIG. 23 is a flowchart illustrating a moving and lining-up process performed by each self-moving printer to undergo maintenance.

FIG. 23 is a flowchart illustrating a moving and lining-up process performed by each self-moving printer 10 to undergo maintenance.

This moving and lining-up process is a process for the self-moving printer 10 to achieve the operation patterns described above with reference to FIGS. 20 to 23. This moving and lining-up process is initiated at the timing at which the maintenance timing has been reached and when there are no more tasks to be executed before the maintenance or at the time the timer started in step S102 in the flowchart illustrated in FIG. 23 is has reached time-up. However, if the self-moving printer 10 is executing another task at the time the timer has reached time-up, the process is initiated after waiting for the task to be completed.

When approaching a target maintenance area, on the basis of a video taken with the camera 11 provided for the self-moving printer 10, the self-moving printer 10 determines whether the end position in the maintenance area is vacant (step S101). If it is determined that the end position is not vacant, the self-moving printer 10 starts a timer (step S102). This timer measures the time when the end position is considered vacant. After starting the timer, the self-moving printer 10 performs a process of another task that the self-moving printer 10 is to execute (step S103). If there are no other tasks that the self-moving printer 10 is to execute, the self-moving printer 10 moves around near the maintenance area. Alternatively, if the remaining power of a built-in battery is low, the self-moving printer 10 returns to the waiting position to be charged. Then, the moving and lining-up process at this time illustrated in FIG. 23 ends.

Then, when the timer started in step S102 has reached time-up, the moving and lining-up process is performed again.

If it is determined in step S101 that the end position in the maintenance area is vacant, the self-moving printer 10 moves to the end position in the maintenance area (step S104), changes its orientation to face the waiting position (step S105), and starts slowly moving forward (step S106). If there are no other self-moving printers 10 ahead (step S107), the self-moving printer 10 moves to the waiting position (step S108) and stops at the waiting position (step S109). On the other hand, if there is another self-moving printer 10 ahead, the self-moving printer approaches the other self-moving printer 10 ahead at a fixed distance (step S107) and stops at the position (step S110). If the self-moving printer 10 ahead moves forward and the distance to the self-moving printer 10 ahead is increased (step S111), the self-moving printer 10 also starts moving forward (step S112). While lined up in the above manner, the self-moving printer 10 moves forward and finally reaches the waiting position. At the waiting position, the self-moving printer 10 undergoes maintenance.

Next, a second exemplary embodiment will be described. Only different parts from the above-described first exemplary embodiment will be described below.

In the first exemplary embodiment described above, upon the server 30 receiving a maintenance task from the manager PC 40, the maintenance task is stored in the server 30 (step S301 in FIG. 16), and the server 30 receives a report about the state of each self-moving printer 10 from the corresponding self-moving printer 10 (FIG. 17) and determines whether there is a maintenance task whose execution timing has been reached. In contrast, in the second exemplary embodiment described below, upon the server 30 receiving a maintenance task from the manager PC 40, the received maintenance task is, in principle, broadcast to all of the self-moving printers 10, even though the maintenance task is stored in the server 30 as a copy for the server 30. Then, each of the self-moving printers 10 determines whether the transmitted maintenance task is relevant to the self-moving printer 10. If the maintenance task is relevant to the self-moving printer 10, the self-moving printer 10 stores the maintenance task inside. Then, the self-moving printer 10 determines by itself whether the maintenance timing has been reached, and if the timing has been reached, the self-moving printer 10 operates to undergo maintenance.

FIG. 24 is a flowchart illustrating a maintenance task reception process performed by the server upon receiving a maintenance task in the second exemplary embodiment. FIG. 24 corresponds to FIG. 16 described above in the first embodiment.

If a manager generates a maintenance task in the above manner by using the manager PC 40, the generated maintenance task is transmitted to the server 30. Upon receiving the maintenance task, the server 30 performs a maintenance task reception process illustrated in FIG. 24.

First, the received maintenance task is stored in the server 30 (step S341). Note that the maintenance task stored in the server 30 is not substantially used for maintenance and is a copy to be stored in the server 30 and used for progress management in the server 30.

Then, the maintenance task received by the server 30 is broadcast to all of the self-moving printers 10 (step S342).

FIG. 25 is a flowchart illustrating a maintenance task reception process performed by each self-moving printer 10 that has received the broadcast maintenance task.

Upon receiving the maintenance task broadcast from the server 30, each of the self-moving printers 10 determines whether the maintenance task is relevant to the self-moving printer 10 (step S111), and if the maintenance task is relevant to the self-moving printer 10, the maintenance task is stored (step S112). If the received maintenance task is irrelevant to the self-moving printer 10, the maintenance task is ignored.

Figure 26:
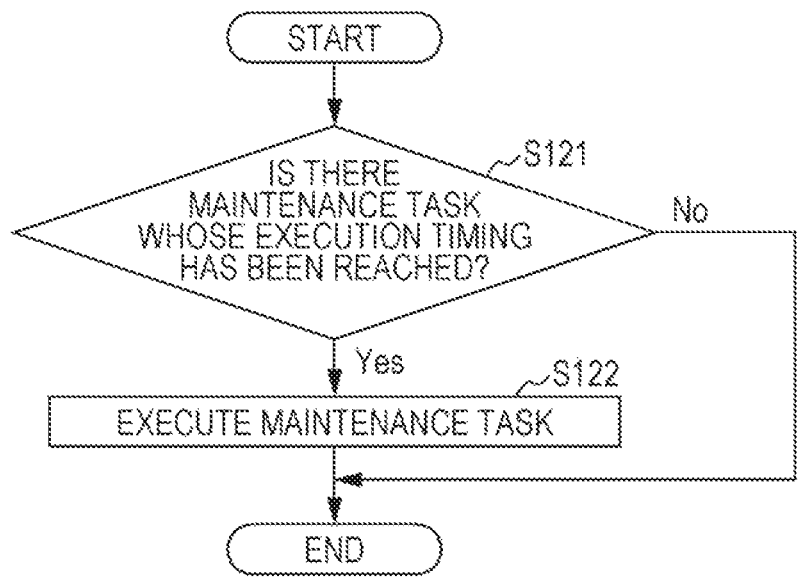
FIG. 26 is a flowchart illustrating a maintenance process in the second exemplary embodiment.

FIG. 26 is a flowchart illustrating a maintenance process in the second exemplary embodiment. The maintenance process illustrated in FIG. 26 corresponds to the maintenance process illustrated in FIG. 18 in the above-described first exemplary embodiment. Note that the maintenance process illustrated in FIG. 26 is performed by each self-moving printer 10, whereas the maintenance process illustrated in FIG. 18 is performed by the server 30.

First, the self-moving printer 10 determines whether there is a maintenance task that is relevant to the self-moving printer 10 and whose execution timing has been reached (step S121). In this example, the determination is performed by comparing the maintenance task stored in step S112 in FIG. 25 with information regarding the state of the self-moving printer 10 collected by the sensors, counters, and the like provided for the self-moving printer 10. If it is determined that there is a maintenance task whose execution timing has been reached, the self-moving printer 10 executes the maintenance task in the order in accordance with the priority of the maintenance and the priority of other tasks that the self-moving printer 10 currently have (step S122).

Figure 27:
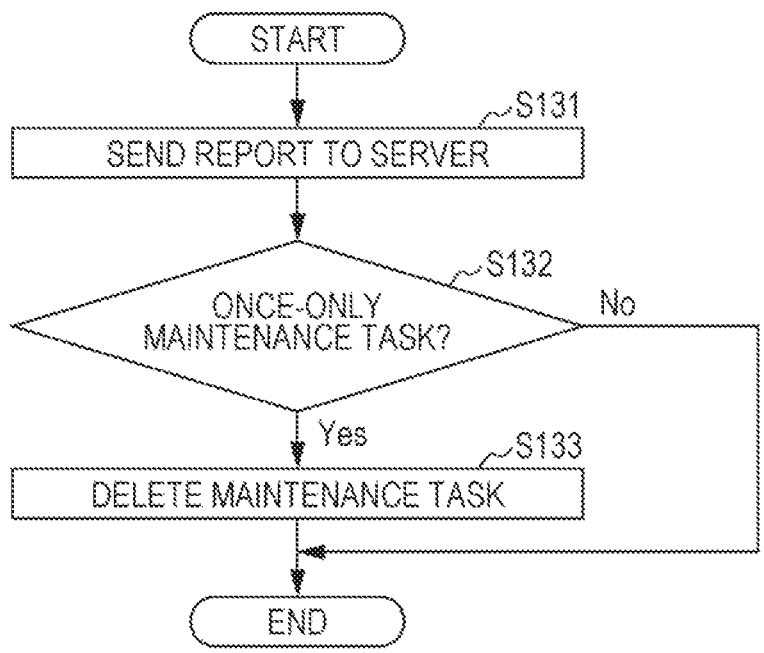
FIG. 27 is a flowchart illustrating a maintenance completion process performed at the time of completion of maintenance in the second exemplary embodiment.

FIG. 27 is a flowchart illustrating a maintenance completion process performed at the time of completion of maintenance in the second exemplary embodiment. FIG. 27 corresponds to FIG. 19 in the above-described first exemplary embodiment.

Each of the self-moving printers 10 is provided with an operation element (not illustrated), such as a push button, which is operated at the time of completion of maintenance. Upon completing maintenance of a certain self-moving printer 10, a maintenance operator who has performed the maintenance at this time operates the operation element, and the self-moving printer 10 is notified of the completion of the maintenance. Then, the self-moving printer 10 performs the maintenance completion process illustrated in FIG. 27.

First, a report about the completion of the maintenance is sent to the server 30 (step S131). This report is for progress management in the server 30.

Then, it is determined whether the maintenance task for the maintenance that has been completed at this time is a maintenance task corresponding to an instruction of once-only maintenance (step S132). If the maintenance task is the maintenance task corresponding to an instruction of once-only maintenance, the maintenance task is deleted (step S133).

The determination as to whether the maintenance timing has been reached may be performed by the server 30 as in the first exemplary embodiment or may be performed by each self-moving printer 10 as in the second exemplary embodiment.

Note that a print system including a self-moving printer that moves to a destination and that performs printing at the destination has been described here as an example of the service providing system according to an exemplary embodiment of the present invention, the present invention is not limited to the print system. For example, the present invention is applicable to any system including a self-moving apparatus and providing a service, such as a system including, as the self-moving apparatus, a delivery apparatus that delivers documents or goods or a system including a nursing-care robot as the self-moving apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A self-moving apparatus that moves and provides a service by moving to a destination in response to and in accordance with an instruction for providing the service, the self-moving apparatus comprising:
    a reception unit that receives a user instruction for causing the self-moving apparatus to move to a predetermined destination if the self-moving apparatus is in a predetermined state relating to maintenance or printing or if the self-moving apparatus is changed to be in the predetermined state;
    a detection unit that detects a state of the self-moving apparatus; and
    a moving unit that moves to the predetermined destination if the self-moving apparatus is in the predetermined state or if the self-moving apparatus is changed to be in the predetermined state on the basis of a detection result obtained by the detection unit.

2. The self-moving apparatus according to claim 1,
    wherein the detection unit detects a plurality of types of states of the self-moving apparatus, and
    wherein, if the detection result obtained by the detection unit indicates that the state of the self-moving apparatus is one of a plurality of types of predetermined states or is changed to be one of the plurality of types of predetermined states, the self-moving apparatus moves to a destination in accordance with the state among a plurality of predetermined destinations.

3. The self-moving apparatus according to claim 1,
    wherein the self-moving apparatus comprises a plurality of self-moving apparatuses, and
    wherein, if each of the self-moving apparatuses is in the predetermined state or if each of the self-moving apparatuses is changed to be in the predetermined state, an instruction unit broadcasts, to the plurality of self-moving apparatuses, an instruction for moving to the predetermined destination.

4. The self-moving apparatus according to claim 1,
    wherein self-moving apparatus comprises a plurality of self-moving apparatuses, and
    wherein, if one of the plurality of self-moving apparatuses moves toward the destination and another one or more of the plurality of self-moving apparatuses are at the destination, the one of the plurality of self-moving apparatuses lines up behind the one or more of the plurality of self-moving apparatuses.

5. The self-moving apparatus according to claim 4,
    wherein, if the one of the plurality of self-moving apparatuses moves toward the destination and another one or more of the plurality of self-moving apparatuses are at the destination, when the one of the plurality of self-moving apparatuses would be outside of a predetermined waiting area if lined up behind the one or more of the plurality of self-moving apparatuses that have already reached the destination, the one of the plurality of self-moving apparatuses does not immediately line up behind the one or more of the plurality of self-moving apparatuses and waits for a timing to line up to be within the predetermined waiting area.

* * * * *